E. BENJESTORF.
ANTISKID CHAIN.
APPLICATION FILED JULY 8, 1919.

1,344,477.

Patented June 22, 1920.

WITNESSES

INVENTOR
E. BENJESTORF
BY
ATTORNEYS

UNITED STATES PATENT OFFICE.

EDWARD BENJESTORF, OF FENWOOD, SASKATCHEWAN, CANADA.

ANTISKID-CHAIN.

1,344,477.  Specification of Letters Patent.  Patented June 22, 1920.

Application filed July 8, 1919. Serial No. 309,464.

*To all whom it may concern:*

Be it known that I, EDWARD BENJESTORF, a citizen of Canada, and a resident of Fenwood, in the Province of Saskatchewan and Dominion of Canada, have invented a new and Improved Antiskid-Chain, of which the following is a full, clear, and exact description.

The present invention relates to new and useful improvements in anti-skid devices for the wheels of motor vehicles.

The invention has for its primary object to provide a device which may be used with all types of wheels with equal facility.

A further object of the invention is to provide a device of this character in which the tire is subjected to a minimum amount of wear.

A still further object of the invention is to provide a device of this character in which the several parts will readily clear themselves of mud and the like.

Referring to the drawings—

Figure 1:
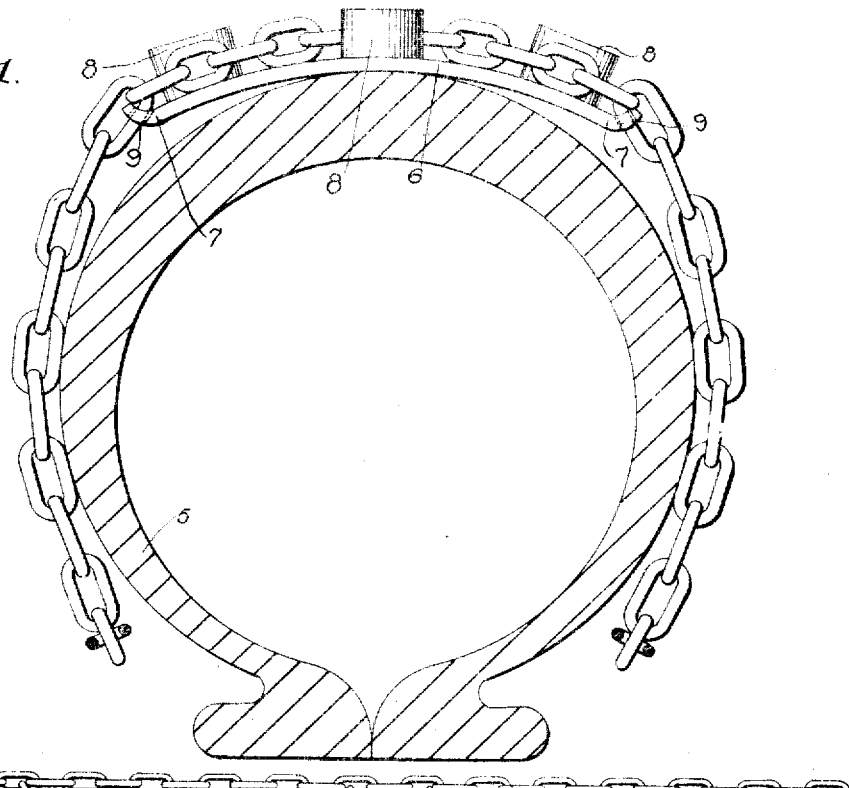
Figure 1 is a sectional view of a pneumatic tire showing the device thereon.
Figure 2:
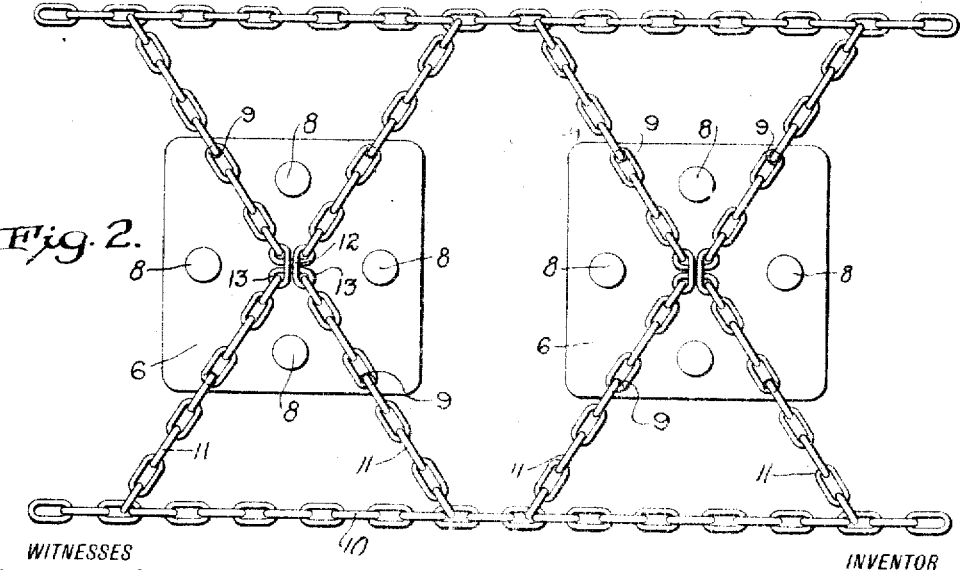
Fig. 2 is a plan view of a portion of the device.

In the drawings, the reference character 5 designates a tire which in the present instance is shown as of the pneumatic type.

Adapted to be positioned at regularly spaced intervals about the tire on its tread portion, are relatively flat plates 6, and, as best shown in Fig. 1, said plates have their side edges upturned as indicated at 7. The plates 6 are provided on their tread surface with a plurality of studs or projecting members 8, which are formed integral therewith and are arranged in spaced relation to each other in rectangular form. Each of the plates 6 is provided on its side edges with spaced openings or apertures 9, the purpose of which will be hereinafter described.

The reference character 10 designates continuous side chains, and connected to said side chains 10, and extending radially outwardly over the plates 6, are short lengths of chain 11, there being two of these short lengths of chain connected to each side chain 10 adjacent each of the plates 6. These short lengths of chain 11 have their inner or meeting ends secured together centrally of their respective plates 6, by means of a single link 12, said link 12 being formed of a single length of suitable material with four substantially circular eyes 13 with which the end links of the short lengths of chain 11 are adapted to engage. In addition to having their inner ends secured together by the links 12, the short lengths of chain are each connected to the plates 6 by having one of their links, such as 14, passed through its respective opening 9 heretofore mentioned.

By this arrangement, it will be apparent that the lugs or projections 8 will serve to prevent skidding of the tire in a sidewise direction, and that owing to the fact that the short lengths of chain pass between said lugs, the possibility of said lugs clogging with mud is removed.

Having thus described the invention, what is claimed is:

1. A device of the character described comprising a pair of side chains, a plurality of tread plates provided on their tread surface with integral projections, and chains carried by said side chains and being connected together centrally of said plates, said chains lying between the integral projections of said tread plates.

2. An anti-skid device for tires comprising a pair of side chains, a plurality of tread plates, integral lugs projecting from said tread plates, chains connecting the side chains and extending across the tread of the tire and tread plates and lying between the integral lugs of said tread plates, and means for connecting said cross chains centrally of the tread plates.

3. A device of the character described comprising a pair of continuous side chains, a plurality of tread plates having integral projections on their tread surface, a plurality of chains carried by said side chains and overlying said tread plates between the integral lugs thereof, and means centrally of said tread plates for connecting the adjacent ends of said chains.

4. An anti-skid device comprising a plurality of side chains, a plurality of tread plates, and a plurality of cross chains for each of said tread plates, said cross chains being secured to said tread plates near their edges and to each other, substantially centrally of said tread plates.

EDWARD BENJESTORF.